US012586554B2

(12) United States Patent
Rafii

(10) Patent No.: US 12,586,554 B2
(45) Date of Patent: *Mar. 24, 2026

(54) METHODS AND APPARATUS TO EXTRACT A PITCH-INDEPENDENT TIMBRE ATTRIBUTE FROM A MEDIA SIGNAL

(71) Applicant: The Nielsen Company (US), LLC, New York, NY (US)

(72) Inventor: Zafar Rafii, Berkeley, CA (US)

(73) Assignee: The Nielsen Company (US), LLC, New York, NY (US)

(*) Notice: Subject to any disclaimer, the term of this patent is extended or adjusted under 35 U.S.C. 154(b) by 78 days.

This patent is subject to a terminal disclaimer.

(21) Appl. No.: 18/743,215

(22) Filed: Jun. 14, 2024

(65) Prior Publication Data

US 2024/0331669 A1 Oct. 3, 2024

Related U.S. Application Data

(63) Continuation of application No. 18/357,526, filed on Jul. 24, 2023, now Pat. No. 12,051,396, which is a (Continued)

(51) Int. Cl.
*G10H 3/12* (2006.01)
*G10H 1/06* (2006.01)

(52) U.S. Cl.
CPC ............... *G10H 3/125* (2013.01); *G10H 1/06* (2013.01); *G10H 2210/056* (2013.01); *G10H 2250/221* (2013.01); *G10H 2250/235* (2013.01)

(58) Field of Classification Search
CPC .... G10H 3/125; G10H 1/06; G10H 2210/056; G10H 2250/221; G10H 2250/235
(Continued)

(56) References Cited

U.S. PATENT DOCUMENTS

| | | | |
|---|---|---|---|
| 2,008,007 | A | 7/1935 | Dreffein |
| 3,681,530 | A | 8/1972 | Manley |

(Continued)

FOREIGN PATENT DOCUMENTS

| | | | | |
|---|---|---|---|---|
| JP | 2009508156 | | 2/2009 | |
| JP | 2009508156 | A * | 2/2009 | ............... G10G 1/04 |

(Continued)

OTHER PUBLICATIONS

K. Jensen, "Pitch independent prototyping of musical sounds," 1999 IEEE Third Workshop on Multimedia Signal Processing (Cat. No. 99TH8451), Copenhagen, Denmark, 1999, pp. 215-220, doi: 10.1109/MMSP. 1999.793823 (Year: 1999).*

(Continued)

*Primary Examiner* — Christina M Schreiber
(74) *Attorney, Agent, or Firm* — McDonnell Boehnen Hulbert & Berghoff LLP

(57) ABSTRACT

Methods and apparatus to extract a pitch-independent timbre attribute from a media signal are disclosed. An example apparatus includes an audio characteristic extractor to determine a logarithmic spectrum of an audio signal; transform the logarithmic spectrum of the audio signal into a frequency domain to generate a transform output; determine a magnitude of the transform output; and determine a timbre attribute of the audio signal based on an inverse transform of the magnitude.

20 Claims, 7 Drawing Sheets

Related U.S. Application Data continuation of application No. 17/157,780, filed on Jan. 25, 2021, now Pat. No. 11,749,244, which is a continuation of application No. 16/821,567, filed on Mar. 17, 2020, now Pat. No. 10,902,831, which is a continuation of application No. 16/659,099, filed on Oct. 21, 2019, now Pat. No. 10,629,178, which is a continuation of application No. 16/239,238, filed on Jan. 3, 2019, now Pat. No. 10,482,863, which is a continuation of application No. 15/920,060, filed on Mar. 13, 2018, now Pat. No. 10,186,247.

(58) Field of Classification Search
USPC .......................................................... 84/603
See application file for complete search history.

(56) References Cited

U.S. PATENT DOCUMENTS 6,054,646 A 4/2000 Pal et al.
6,363,345 B1 3/2002 Marash et al.
7,406,356 B2 7/2008 Peeters et al.
7,667,125 B2 * 2/2010 Taub ........................ G10H 1/00 84/654
8,311,821 B2 11/2012 Breebaart et al.
8,380,331 B1 * 2/2013 Smaragdis .............. G10L 25/90 84/613
8,942,977 B2 * 1/2015 Chen ....................... G10L 15/02 704/235
9,135,923 B1 * 9/2015 Chen ....................... G10L 25/90
9,202,472 B1 12/2015 Sharifi et al.
9,916,834 B2 3/2018 Sukowski et al.
10,186,247 B1 * 1/2019 Rafii ...................... G10H 3/125
10,482,863 B2 * 11/2019 Rafii ........................ G10H 1/06
10,629,178 B2 * 4/2020 Rafii ...................... G10H 3/125
10,902,831 B2 * 1/2021 Rafii ...................... G10H 3/125
11,749,244 B2 * 9/2023 Rafii ........................ G10H 1/06 84/603
12,051,396 B2 * 7/2024 Rafii ........................ G10H 1/06
2005/0108004 A1 5/2005 Otani et al.
2005/0211071 A1 * 9/2005 Lu ........................... G10H 1/00 84/611
2007/0107584 A1 * 5/2007 Kim ....................... G11B 27/28 84/612
2007/0131096 A1 * 6/2007 Lu ........................ G10H 1/0008 84/611
2007/0169613 A1 7/2007 Kim et al.
2007/0174274 A1 7/2007 Kim et al.
2007/0291958 A1 * 12/2007 Jehan ................... G10H 1/0025 381/103
2008/0075303 A1 3/2008 Kim et al.
2008/0082323 A1 * 4/2008 Bai ......................... G06F 18/00 704/214
2008/0190269 A1 8/2008 Eom et al.
2008/0271592 A1 * 11/2008 Beckford ............. G10H 1/0008 84/645
2010/0131086 A1 * 5/2010 Itoyama ................. G10H 3/125 703/2
2010/0154619 A1 * 6/2010 Taub ........................ G10H 1/00 84/616
2010/0241423 A1 9/2010 Jackson et al.
2011/0303075 A1 * 12/2011 McMillen .............. G10H 1/125 84/645
2013/0019739 A1 1/2013 Vainaila
2013/0151256 A1 6/2013 Nakano et al.
2013/0182862 A1 * 7/2013 Disch ....................... G10H 1/08 381/61
2013/0339011 A1 * 12/2013 Visser .................... G10H 1/361 704/207
2014/0074469 A1 3/2014 Zhidkov
2014/0180674 A1 * 6/2014 Neuhauser .............. G10L 25/81 704/9
2014/0200889 A1 * 7/2014 Chen ....................... G10L 15/02 704/235
2015/0262587 A1 9/2015 Chen
2016/0037275 A1 2/2016 Drullinger et al.
2016/0196812 A1 7/2016 Rashad et al.
2017/0094440 A1 3/2017 Brown et al.
2018/0018979 A1 1/2018 Rolland et al.
2018/0068646 A1 * 3/2018 Esparza ................. G10D 13/02
2018/0276540 A1 9/2018 Xing
2019/0287506 A1 * 9/2019 Rafii ...................... G10H 3/125
2020/0051538 A1 * 2/2020 Rafii ........................ G10H 1/06
2020/0219473 A1 * 7/2020 Rafii ...................... G10H 3/125
2020/0286505 A1 * 9/2020 Osborne .................. G06N 7/01
2021/0090535 A1 * 3/2021 Miles ................... G10H 1/0008
2021/0151021 A1 * 5/2021 Rafii ........................ G10H 1/06
2021/0327400 A1 * 10/2021 Rafii .................... G10K 11/175
2023/0368761 A1 * 11/2023 Rafii ...................... G10H 3/125
2024/0331669 A1 * 10/2024 Rafii ........................ G10H 1/06

FOREIGN PATENT DOCUMENTS

JP 2010518428 5/2010
JP 2011217052 10/2011
JP 2017040963 2/2017
JP 2017090848 5/2017
KR 10-1101384 1/2012
KR 10-1757338 7/2017
WO 2007029002 3/2007
WO 2014202770 12/2014

OTHER PUBLICATIONS

European Patent Office, "Examination Report," issued in connection with EP Application No. 19766557.3, dated Nov. 30, 2021,10 pages.

Duffieu et al., "A musically motivated mid-level representation for pitch estimation and musical audio source separation," IEE Journal of Selected Topics in Signal Processing, vol. 5, No. 6, Oct. 1, 2011, submitted to HAL open science on May 29, 2020, 13 pages.

European Patent Office, "Communication pursuant to Rule 70(2) and 70a(2) EPC," issued in connection with EP Application No. 19766557.3, dated Dec. 17, 2021, 1 pages.

Japanese Patent Office, "Notice of Reasons for Rejection," issued in JP Application No. 2020-545802, dated Nov. 30, 2021, 7 pages.

Japanese Patent Office, "Notice of Reasons for Rejection," issued in JP Application No. 2020-545802, dated Jul. 12, 2022, 5 pages.

Patent Cooperation Treaty, "International Search Report," mailed in connection with International Patent Application No. PCT/US2019/021865, on Jun. 27, 2019, 4 pages.

Patent Cooperation Treaty, "Written Opinion of the International Search Authority, " mailed in connection with International Patent Application No. PCT/US2019/021865, on Jun. 27, 2019, 3 pages.

United States Patent and Trademark Office, "Notice of Allowance and Fee(s) Due", issued in connection with U.S. Appl. No. 15/920,060, filed Sep. 11, 2019, 8 pages.

United States Patent and Trademark Office, "Non-Final Office Action," issued in connection with U.S. Appl. No. 16/239,238, filed Mar. 22, 2019, 5 pages.

United States Patent and Trademark Office, "Notice of Allowance and Fee(s) Due," issued in connection with U.S. Appl. No. 16/239,238, filed Jul. 15, 2019, 8 pages.

Marozeau, Jeremy et al., "The Dependency of Timbre on Fundamental Frequency," The Journal of the Acoustical Society of America, Nov. 2003, pp. 2946-2957, 12 pages.

United States Patent and Trademark Office, "Notice of Allowance and Fee(s) Due," issued in connection with U.S. Appl. No. 16/659,099, filed Dec. 18, 2019, 8 pages.

Patent Cooperation Treaty, "International Preliminary Report on Patentability," mailed in connection with International Patent Application No. PCT/US2019/021865, filed Sep. 15, 2020, 4 pages.

United States Patent and Trademark Office, "Non-Final Office Action," issued in connection with U.S. Appl. No. 16/821,567, filed Jun. 1, 2020, 7 pages.

United States Patent and Trademark Office, "Notice of Allowance and Fee(s) Due," issued in connection with U.S. Appl. No. 16/821,567, filed Sep. 23, 2020, 5 pages.

(56) References Cited

OTHER PUBLICATIONS

Turnbull, D., "Automatic Music Annotation", Internet Citation, May 24, 2005 (May 25, 2005), pp. 1-19, XP002569975.
Jensen, K., "Pitch independent prototyping of musical sounds," 1999 IEEE Third Workshop on Multimedia Signal Processing (Cat. No. 99TH8451), Copenhagen, Denmark, 1999, pp. 215-220.
European Search Report in corresponding application No. 20891501.7 dated Oct. 13, 2023, 5 pages.
European Examination Report in corresponding application No. 19766557.3 dated Dec. 1, 2023, 6 pages.
Extended European Search Report for corresponding European Patent Application No. 25198533.9 dated Oct. 28, 2025, 10 pages.
Kostek, Bozena, "Musical Instrument Classification and Duet Analysis Employing Music Information Retrieval Techniques," Proceedings of the IEEE, vol. 92, No. 4, pp. 712-729, (Apr. 2004).
Park et al., "Clustering Algorithm for Unsupervised Monaural Musical Sound Separation Based on Non-negative Matrix Factorization," IEICE Trans. Fundamentals, vol. E95-A, No. 4, pp. 818-823, (Apr. 2012).

* cited by examiner

METHODS AND APPARATUS TO EXTRACT A PITCH-INDEPENDENT TIMBRE ATTRIBUTE FROM A MEDIA SIGNAL

RELATED APPLICATION

This patent arises from a continuation of U.S. patent application Ser. No. 18/357,526, entitled "METHODS AND APPARATUS TO EXTRACT A PITCH-INDEPENDENT TIMBRE ATTRIBUTE FROM A MEDIA SIGNAL," filed on Jul. 24, 2023, which is a continuation of U.S. patent application Ser. No. 17/157,780 entitled "METHODS AND APPARATUS TO EXTRACT A PITCH-INDEPENDENT TIMBRE ATTRIBUTE FROM A MEDIA SIGNAL," filed on Jan. 25, 2021, which is a continuation of U.S. patent application Ser. No. 16/821,567, entitled "METHODS AND APPARATUS TO EXTRACT A PITCH-INDEPENDENT TIMBRE ATTRIBUTE FROM A MEDIA SIGNAL," filed on Mar. 17, 2020, which is a continuation of U.S. patent application Ser. No. 16/659,099, entitled "METHODS AND APPARATUS TO EXTRACT A PITCH-INDEPENDENT TIMBRE ATTRIBUTE FROM A MEDIA SIGNAL," filed on Oct. 21, 2019, which is a continuation of U.S. patent application Ser. No. 16/239,238, entitled "METHODS AND APPARATUS TO EXTRACT A PITCH-INDEPENDENT TIMBRE ATTRIBUTE FROM A MEDIA SIGNAL," filed on Jan. 3, 2019, which is a continuation of U.S. patent application Ser. No. 15/920,060, entitled "METHODS AND APPARATUS TO EXTRACT A PITCH-INDEPENDENT TIMBRE ATTRIBUTE FROM A MEDIA SIGNAL," filed on Mar. 13, 2018. Priority to U.S. patent application Ser. No. 18/357,526, U.S. application Ser. No. 17/157,780, U.S. application Ser. No. 16/821,567, U.S. patent application Ser. No. 16/659,099, U.S. patent application Ser. No. 16/239,238, and U.S. patent application Ser. No. 15/920,060 is claimed. U.S. patent application Ser. No. 18/357,526, U.S. application Ser. No. 17/157,780 U.S. patent application Ser. No. 16/821,567, U.S. patent application Ser. No. 16/659,099, U.S. patent application Ser. No. 16/239,238, and U.S. patent application Ser. No. 15/920,060 are incorporated herein by reference in their entireties.

FIELD OF THE DISCLOSURE

This disclosure relates generally to audio processing and, more particularly, to methods and apparatus to extract a pitch-independent timbre attribute from a media signal.

BACKGROUND

Timbre (e.g., timbre/timbral attributes) is a quality/character of audio, regardless of audio pitch or loudness. Timbre is what makes two different sounds sound different from each other, even when they have the same pitch and loudness. For example, a guitar and a flute playing the same note at the same amplitude sound different because the guitar and the flute have different timbre. Timbre corresponds to a frequency and time envelope of an audio event (e.g., the distribution of energy along time and frequency). The characteristics of audio that correspond to the perception of timbre include spectrum and envelope.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
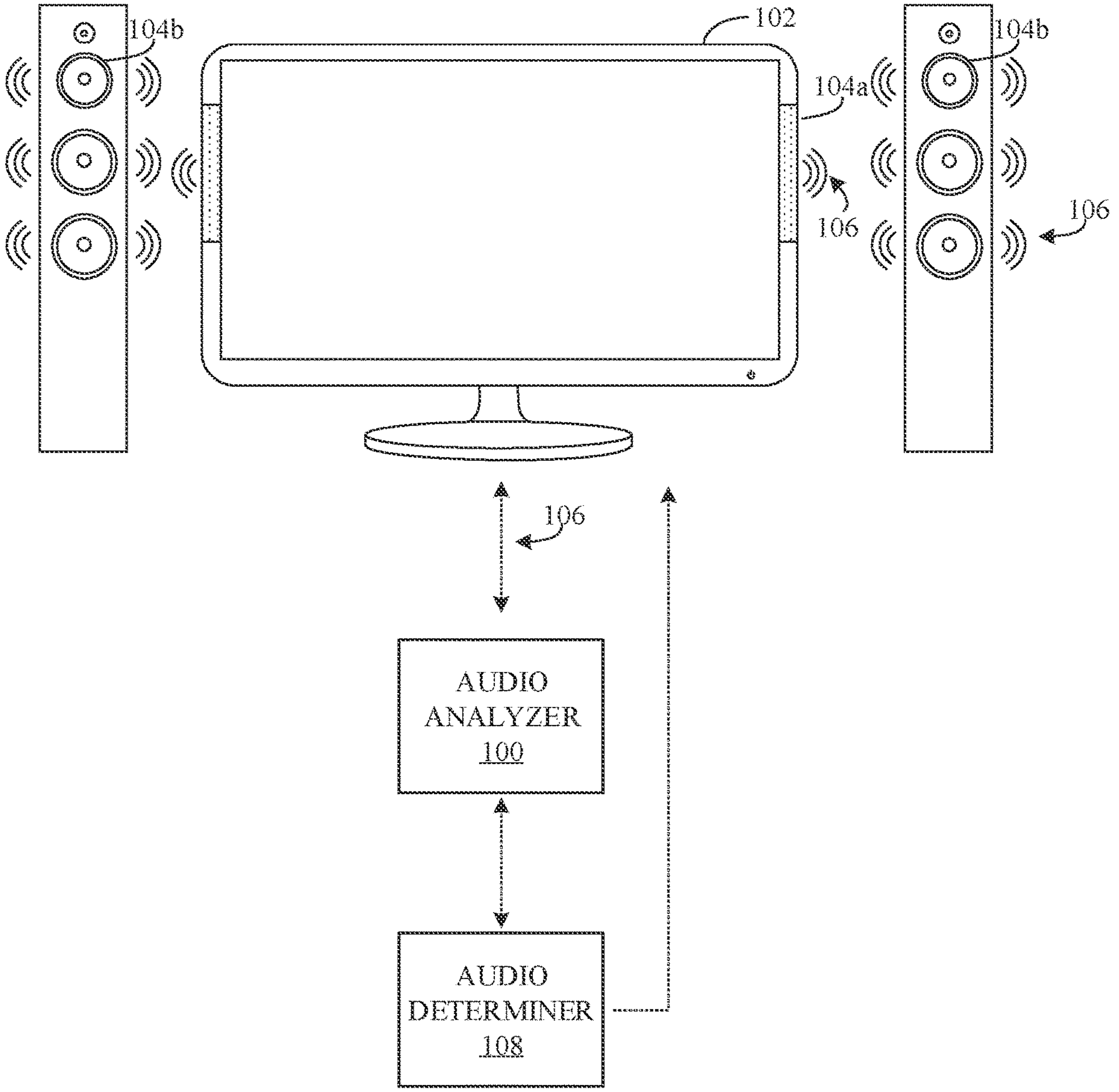
FIG. 1 is an illustration of an example meter to extract a pitch-independent timbre attribute from a media signal.

Audio meters are devices that capture audio signals (e.g., directly or indirectly) to process the audio signals. For example, when a panelist signs up to have their exposure to media monitored by an audience measurement entity, the audience measurement entity may send a technician to the home of the panelist to install a meter (e.g., a media monitor) capable of gathering media exposure data from a media output device(s) (e.g., a television, a radio, a computer, etc.). In another example, meters may correspond to instructions being executed on a processor in smart phones, for example, to process received audio and/or video data to determine characteristics of the media.

Generally, a meter includes or is otherwise connected to an interface to receive media signals directly from a media source or indirectly (e.g., a microphone and/or a magnetic-coupling device to gather ambient audio). For example, when the media output device is "on," the microphone may receive an acoustic signal transmitted by the media output device. The meter may process the received acoustic signal to determine characteristics of the audio that may be used to characterize and/or identify the audio or a source of the audio. When a meter corresponds to instructions that operate within and/or in conjunction with a media output device to receive audio and/or video signals to be output by the media output device, the meter may process/analyze the incoming audio and/or video signals to directly determine data related to the signals. For example, a meter may operate in a set-top-box, a receiver, a mobile phone, etc. to receive and process incoming audio/video data prior to, during, or after being output by a media output device.

In some examples, audio metering devices/instructions utilize various characteristics of audio to classify and/or identify audio and/or audio sources. Such characteristics may include energies of a media signal, energies of the frequency bands of media signals, discrete cosine transform (DCT) coefficients of a media signal, etc. Examples disclosed herein classify and/or identify media based on timbre of the audio corresponding to a media signal.

Timbre (e.g., timbre/timbral attributes) is a quality/character of audio, regardless of audio pitch or loudness. For example, a guitar and a flute playing the same note at the same amplitude sound different because the guitar and the flute have different timbre. Timbre corresponds to a frequency and time envelope of an audio event (e.g., the distribution of energy along time and frequency). Traditionally, timbre has been characterized though various features. However, timbre has not been extracted from audio, independent of other aspects of the audio (e.g., pitch). Accordingly, identifying media based on pitch-dependent timbre measurements would require a large database of reference pitch-dependent timbres corresponding to timbres for each category and each pitch. Examples disclosed herein extract a pitch-independent timbre log-spectrum from measured audio that is independent from pitch, thereby reducing the resources required to classify and/or identify media based on timbre.

As explained above, the extracted pitch-independent timbre may be used to classify media and/or identify media and/or may be used as part of a signaturing algorithm. For example, extracted pitch-independent timbre attribute (e.g., log-spectrum) may be used to determine that measured audio (e.g., audio samples) corresponds to violin, regardless of the notes being played by the violin. In some examples, the characteristic audio may be used to adjust audio settings of a media output device to provide a better audio experience for a user. For example, some audio equalizer settings may be better suited for audio from a particular instrument and/or genre. Accordingly, examples disclosed herein may adjust the audio equalizer settings of a media output device based on an identified instrument/genre corresponding to an extracted timbre. In another example, extracted pitch-independent timbre may be used to identify a media being output by a media presentation device (e.g., a television, computer, radio, smartphone, tablet, etc.) by comparing the extracted pitch-independent timbre attribute to reference timbre attributes in a database. In this manner, the extracted timbre and/or pitch may be used to provide an audience measurement entity with more detailed media exposure information than conventional techniques that only consider pitch of received audio.

FIG. 1 illustrates an example audio analyzer 100 to extract a pitch-independent timbre attribute from a media signal. FIG. 1 includes the example audio analyzer 100, an example media output device 102, example speakers 104*a*, 104*b*, an example media signal 106, and an example audio determiner 108.

The example audio analyzer 100 of FIG. 1 receives media signals from a device (e.g., the example media output device 102 and/or the example speakers 104*a*, 104*b*) and processes the media signal to determine a pitch-independent timbre attribute (e.g., log-spectrum) and a timbre-independent pitch attribute. In some examples, the audio analyzer 100 may include, or otherwise be connected to, a microphone to receive the example media signal 106 by sensing ambient audio. In such examples, the audio analyzer 100 may be implemented in a meter or other computing device utilizing a microphone (e.g., a computer, a tablet, a smartphone, a smart watch, etc.). In some examples, the audio analyzer 100 includes an interface to receive the example media signal 106 directly (e.g., via a wired or wireless connection) from the example media output device 102 and/or a media presentation device presenting the media to the media output device 102. For example, the audio analyzer 100 may receive the media signal 106 directly from a set-top-box, a mobile phone, a gaming device, an audio receiver, a DVD player, a blue-ray player, a tablet, and/or any other devices that provides media to be output by the media output device 102 and/or the example speakers 104*a*, 104*b*. As further described below in conjunction with FIG. 2, the example audio analyzer 100 extracts the pitch-independent timbre attribute and/or the timbre-independent pitch attribute from the media signal 106. If the media signal 106 is a video signal with an audio component, the example audio analyzer 100 extracts the audio component from the media signal 106 prior to extracting the pitch and/or timbre.

The example media output device 102 of FIG. 1 is a device that outputs media. Although the example media output device 102 of FIG. 1 is illustrated as a television, the example media output device 102 may be a radio, an MP3 player, a video game counsel, a stereo system, a mobile device, a tablet, a computing device, a tablet, a laptop, a projector, a DVD player, a set-top-box, an over-the-top device, and/or any device capable of outputting media (e.g., video and/or audio). The example media output device may include speakers 104*a* and/or may be coupled, or otherwise connected to portable speakers 104*b* via a wired or wireless connection. The example speakers 104*a*, 104*b* output the audio portion of the media output by the example media output device. In the illustrated example of FIG. 1, the media signal 106 represents audio that is output by the example speakers 104*a*, 104*b*. Additionally or alternatively, the example media signal 106 may be an audio signal and/or a video signal that is transmitted to the example media output device 102 and/or the example speakers 104*a*, 104*b* to be output by the example media output device 102 and/or the example speakers 104*a*, 104*b*. For example, the example media signal 106 may be a signal from a gaming counsel that is transmitted to the example media output device 102 and/or the example speakers 104*a*, 104*b* to output audio and video of a video game. The example audio analyzer 100 may receive the media signal 106 directly from the media presentation device (e.g., the gaming counsel) and/or from the ambient audio. In this manner, the audio analyzer 100 may classify and/or identify audio from a media signal even when the speakers 104*a*, 104*b* are off, not working, or turned down.

The example audio determiner 108 of FIG. 1 characterizes audio and/or identifies media based on a receives pitch-independent timbre attribute measurements from the example audio analyzer 100. For example, the audio determiner 108 may include a database of reference pitch-independent timbre attributes corresponding to classifications and/or identifications. In this manner, the example audio determiner 108 may compare received pitch-independent timbre attribute(s) with the reference pitch-independent attribute to identify a match. If the example audio determiner 108 identifies a match, the example audio determiner 108 classifies the audio and/or identifies the media on information corresponding to the matched reference timbre attribute. For example, if a received timbre attribute matches a reference attribute corresponding to a trumpet, the example audio determiner 108 classifies the audio corresponding to the received timbre attribute as audio from a trumpet. In such an example, if the audio analyzer 100 is part of a mobile phone, the example audio analyzer 100 may receive an audio signal of the trumpet playing a song (e.g., via an interface receiving the audio/video signal or via a microphone of the mobile phone receiving the audio signal). In this manner, the audio determiner 108 may identify that the instrument corresponding to the received audio is a trumpet and identify the trumpet to the user (e.g., using a user interface of the mobile device). In another example, if a received timbre attribute matches a reference attribute corresponding to a particular video game, the example audio determiner 108 may identify the audio corresponding to the received timbre attribute as being from the particular video game. The example audio determiner 108 may generate a report to identify the audio. In this manner, an audience measurement entity may credit exposure to the video game based on the report. In some examples, the audio determiner 108 receives the timbre directly from the audio analyzer 100 (e.g., both the audio analyzer 100 and the audio determiner 108 are located in the same device). In some examples, the audio determiner 108 is located in a different location and receives the timbre from the example audio analyzer 100 via a wireless communication. In some example the audio determiner 108 transmits instructions to the example audio media output device 102 and/or the example audio analyzer 100 (e.g., when the example audio analyzer 100 is implemented in the example media output device 102) to adjust the audio equalizer settings based on the audio classification. For example, if the audio determiner 108 classifies audio being output by the media output device 102 as being from a trumpet, the example audio determiner 108 may transmit instructions to adjust the audio equalizer settings to settings that correspond to trumpet audio. The example audio determiner 108 is further described below in conjunction with FIG. 2.

Figure 2:
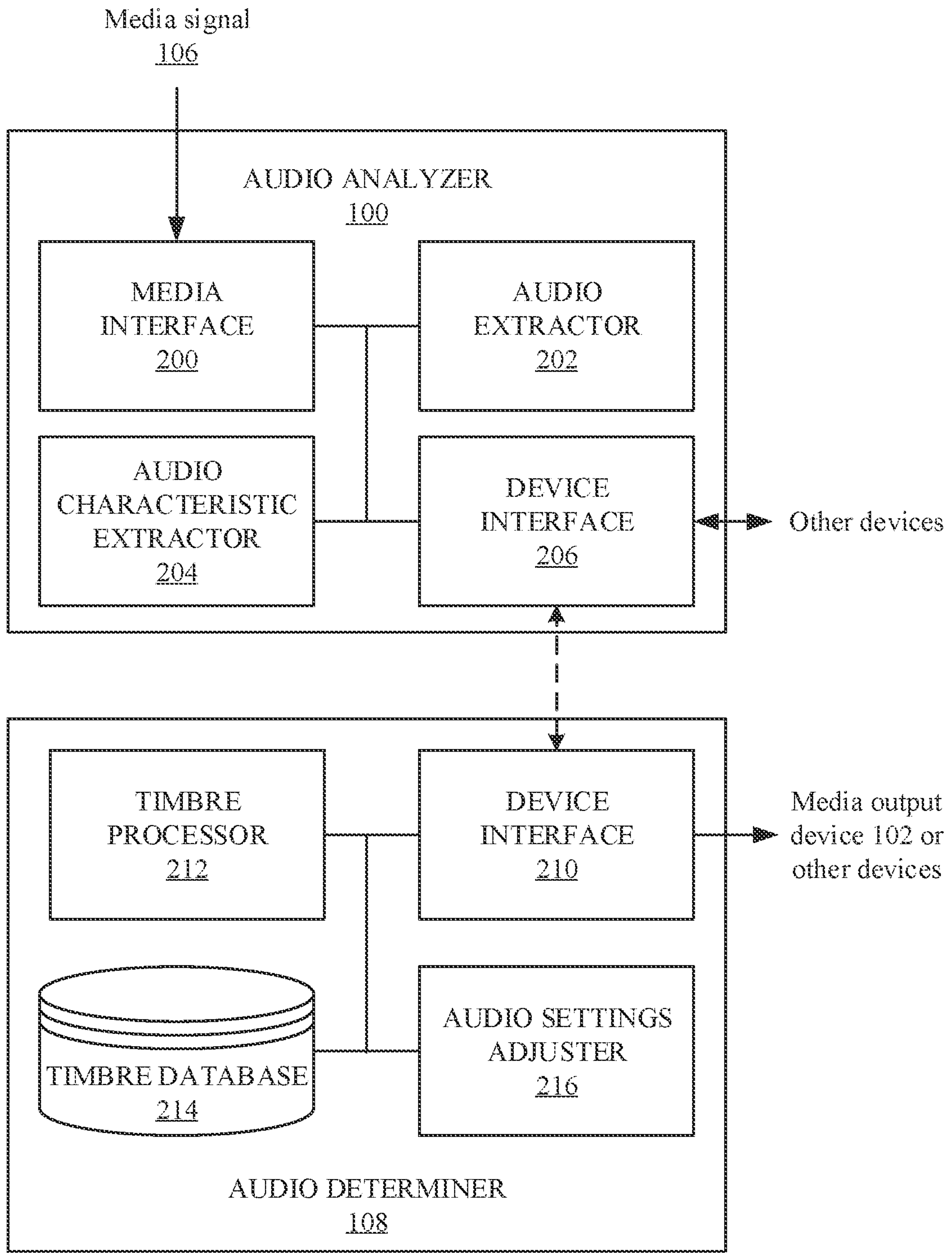
FIG. 2 is a block diagram of an example audio analyzer and an example audio determiner of FIG. 1.

FIG. 2 includes block diagrams of example implementations of the example audio analyzer 100 and the example audio determiner 108 of FIG. 1. The example audio analyzer 100 of FIG. 2 includes an example media interface 200, an example audio extractor 202, an example audio characteristic extractor 204, and an example device interface 206. The example audio determiner 108 of FIG. 2 includes an example device interface 210, an example timbre processor 212, an example timbre database 214, and an example audio settings adjuster 216. In some examples, elements of the example audio analyzer 100 may be implemented in the example audio determiner 108 and/or elements of the example audio determiner 108 may be implemented in the example audio analyzer 100.

The example media interface 200 of FIG. 2 receives (e.g., samples) the example media signal 106 of FIG. 1. In some examples, the media interface 200 may be a microphone used to obtain the media signal 106 as audio by gathering the media signal 106 through the sensing of ambient audio. In some examples, the media interface 200 may be an interface to directly receive an audio and/or video signal (e.g., a digital representation of a media signal) that is to be output by the example media output device 102. In some examples, the media interface 200 may include two interfaces, a microphone for detecting and sampling ambient audio and an interface to directly receive and/or sample an audio and/or video signal.

The example audio extractor 202 of FIG. 2 extracts audio from the received/sampled media signal 106. For example, the audio extractor 202 determines if a received media signal 106 corresponds to an audio signal or a video signal with an audio component. If the media signal corresponds to a video signal with an audio component, the example audio extractor 202 extracts the audio component to generate the audio signal/samples for further processing.

The example audio characteristic extractor 204 of FIG. 2 processes the audio signal/samples to extract a pitch-independent timbre log-spectrum and/or a timbre-independent pitch log-spectrum. A log-spectrum is a convolution between a pitch-independent (e.g., pitch-less) timbre log-spectrum and the timbre-independent (e.g., timbre-less) pitch log-spectrum (e.g., $X=T*P$, where X is the log-spectrum of an audio signal, T is the pitch-independent log-spectrum, and P is the timbre-independent pitch log-spectrum). Thus, in the Fourier domain, the magnitude of the Fourier transform (FT) of the log-spectrum on an audio signal may correspond to an approximation of the FT of the timbre (e.g., $F(X)=F(T)\times F(P)$, where $F(\cdot)$ is a Fourier transform, $F(T)\approx|F(X)|$, and $F(P)\approx e^{j\ arg(F(X))}$). A complex argument is a combination of the magnitude and the phase (e.g., corresponding to energy and offset). Thus, the FT of the timbre can be approximated by the magnitude of the FT of the log-spectrum. Accordingly, to determine the pitch-independent timbre log-spectrum and/or timbre-independent pitch log-spectrum of the audio signal, the example audio characteristic extractor 204 determines the log-spectrum of the audio signal (e.g., using a constant Q transform (CQT)) and transforms the log-spectrum into the frequency domain (e.g., using a FT). In this manner, the example audio characteristic extractor 204 (A) determines the pitch-dependent timbre log-spectrum based on an inverse transform (e.g., inverse Fourier transform ($F^{-1}$) of the magnitude of the transform output (e.g., $T=F^{-1}(|F(X)|)$) and (B) determines the timbre-less pitch log-spectrum based on an inverse transform of a complex argument of the transform output (e.g., $P=F^{-1}(e^{j\ arg(F(X))})$). The log frequency scale of an audio spectrum of the audio signal allows a pitch shift to be equivalent to a vertical translation. Thus, the example audio characteristic extractor 204 determines the log-spectrum of the audio signal using a CQT.

In some examples, if the example audio characteristic extractor 204 of FIG. 2 determines that resulting timbre and/or pitch is not satisfactory, the audio characteristic extractor 204 filters the results to improve the decomposition. For example, the audio characteristic extractor 204 may filter the results by emphasizing particular harmonics in the timbre or by forcing a single peak/line in the pitch and updating other components of the result. The example audio characteristic extractor 204 may filter once or may perform an iterative algorithm while updating the filter/pitch at each iteration, thereby ensuring that the overall convolution of pitch and timbre result in the original log-spectrum of the audio. The audio characteristic extractor 204 may determine that the results are unsatisfactory based on user and/or manufacturer preferences.

The example device interface 206 of the example audio analyzer 100 of FIG. 2 interfaces with the example audio determiner 108 and/or other devices (e.g., user interfaces, processing device, etc.). For example, when the audio characteristic extractor 204 determines the pitch-independent timbre attribute, the example device interface 206 may transmit the attribute to the example audio determiner 108 to classify the audio and/or identify media. In response, the device interface 206 may receive a classification and/or identification (e.g., an identifier corresponding to the source of the media signal 106) from the example audio determiner 108 (e.g., in a signal or report). In such an example, the example device interface 206 may transmit the classification and/or identification to other devices (e.g., a user interface) to display the classification and/or identification to a user. For example, if the audio analyzer 100 is being used in conjunction with a smart phone, the device interface 206 may output the results of the classification and/or identification to a user of the smartphone via an interface (e.g., screen) of the smartphone.

The example device interface 210 of the example audio determiner 108 of FIG. 2 receives pitch-independent timbre attributes from the example audio analyzer 100. Additionally, the example device interface 210 outputs a signal/report representative of the classification and/or identification determined by the example audio determiner 108. The report may be a signal that corresponds to the classification and/or identification based on the received timbre. In some examples, the device interface 210 transmits the report (e.g., including an identification of media corresponding to the timbre) to a processor (e.g., such as a processor of an audience measurement entity) for further processing. For example, the processor of the receiving device may process the report to generate media exposure metrics, audience measurement metrics, etc. In some examples, the device interface 210 transmits the report to the example audio analyzer 100.

The example timbre processor 212 of FIG. 2 processes the received timbre attribute of the example audio analyzer 100 to characterize the audio and/or identify the source of the audio. For example, the timbre processor 212 may compare the received timbre attribute to reference attributes in the example timbre database 214. In this manner, if the example timbre processor 212 determines that the received timbre attribute matches a reference attribute, the example timbre processor 212 classifies and/or identifies a source of the audio based on data corresponding to the matched reference timbre attribute. For example, if the timbre processor 212 determines that a received timbre attribute matches a reference timbre attribute that corresponds to a particular commercial, the timbre processor 212 identifies the source of the audio to be the particular commercial. In some examples, the classification may include a genre classification. For example, if the example timbre processor 212 determines a number of instruments based on the timbre, the example timbre processor 212 may identify a genre of audio (e.g., classical, rock, hip hop, etc.) based on the identified instruments and/or based on the timbre itself. In some examples, when the timbre processor 212 does not find a match, the example timbre processor 212 stores the received timbre attribute in the timbre database 214 to become a new reference timbre attribute. If the example timbre processor 212 stores a new reference timbre in the example timbre database 214, the example device interface 210 transmits instructions to the example audio analyzer 100 to prompt a user for identification information (e.g., what is the classification of the audio, what is the source of the media, etc.). In this manner, if the audio analyzer 100 responds with additional information, the timbre database 214 may store the additional information in conjunction with the new reference timbre. In some examples, a technician analyzes the new reference timbre to determine the additional information. The example timbre processor 212 generates a report based on the classification and/or identification.

The example audio settings adjuster 216 of FIG. 2 determines audio equalizer settings based on the classified audio. For example, if the classified audio corresponds to one or more instruments and/or a genre, the example audio settings adjuster 216 may determine an audio equalizer setting corresponding to the one or more instruments and/or the genre. In some examples, if the audio is classified as classical music, the example audio setting adjuster 216 may select a classical audio equalizer setting (e.g., based on a level of bass, a level of tremble, etc.) corresponding to classical music. In this manner, the example device interface 210 may transmit the audio equalizer setting to the example media output device 102 and/or the example audio analyzer 100 to adjust the audio equalizer settings of the example media output device 102.

While an example manner of implementing the example audio analyzer 100 and the example audio determiner 108 of FIG. 1 is illustrated in FIG. 2, one or more of the elements, processes and/or devices illustrated in FIG. 2 may be combined, divided, re-arranged, omitted, eliminated and/or implemented in any other way. Further, the example media interface 200, the example audio extractor 202, the example audio characteristic extractor 204, the example device interface 206, the example audio settings adjuster 216, and/or, more generally, the example audio analyzer 100 of FIG. 2 and/or the example device interface 210, the example timbre processor 212, the example timbre database 214, the example audio settings adjuster 216, and/or, more generally, the example audio determiner 108 of FIG. 2 may be implemented by hardware, software, firmware and/or any combination of hardware, software and/or firmware. Thus, for example, any of the example media interface 200, the example audio extractor 202, the example audio characteristic extractor 204, the example device interface 206, and/or, more generally, the example audio analyzer 100 of FIG. 2 and/or the example device interface 210, the example timbre processor 212, the example timbre database 214, the example audio settings adjuster 216, and/or, more generally, the example audio determiner 108 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media interface 200, the example audio extractor 202, the example audio characteristic extractor 204, the example device interface 206, and/or, more generally, the example audio analyzer 100 of FIG. 2 and/or the example device interface 210, the example timbre processor 212, the example timbre database 214, the example audio settings adjuster 216, and/or, more generally, the example audio determiner 108 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audio analyzer 100 and/or the example audio determiner 108 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
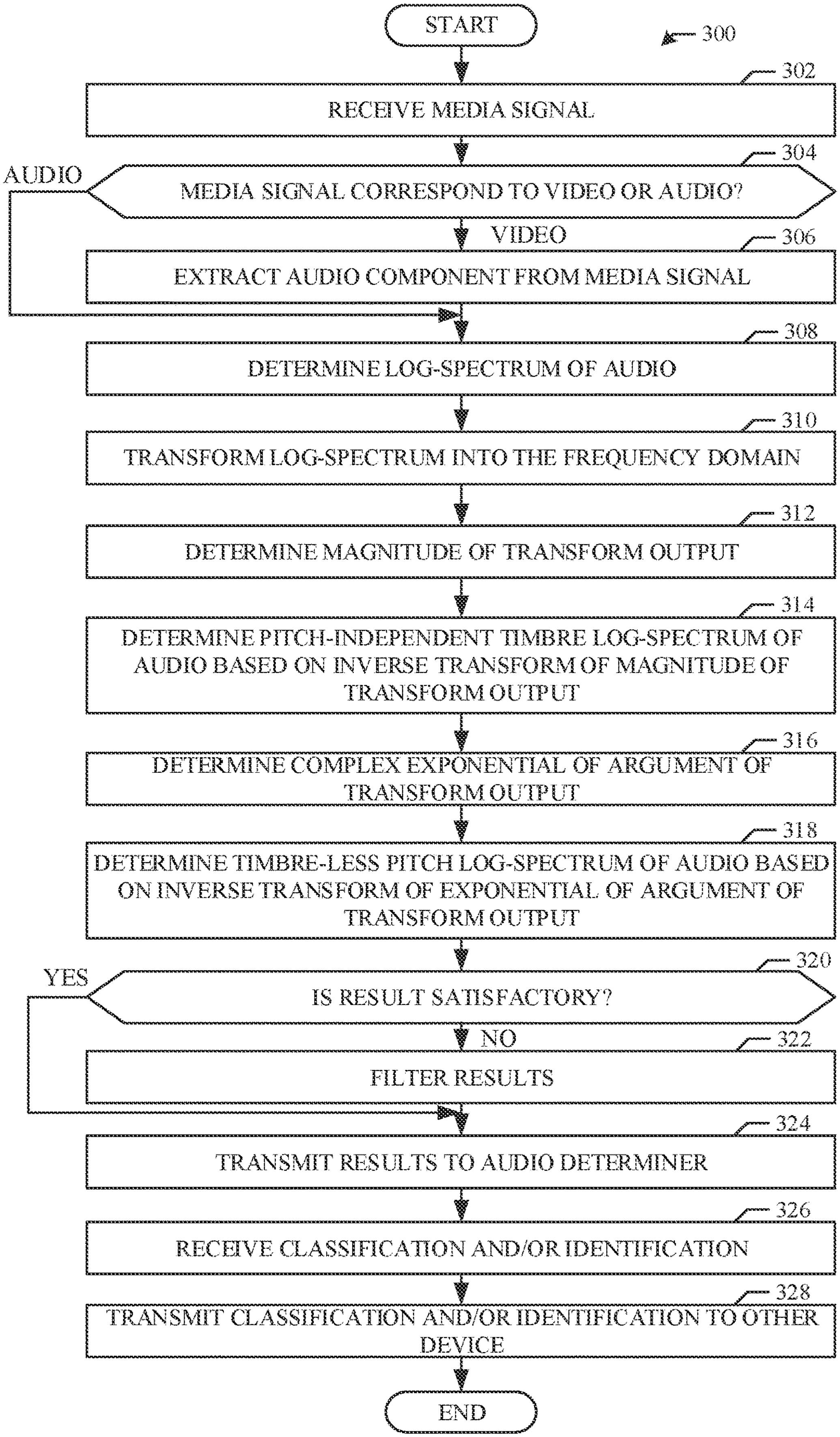
FIG. 3 is a flowchart representative of example machine readable instructions that may be executed to implement the example audio analyzer of FIGS. 1 and 2 to extract a pitch-independent timbre attribute from a media signal and/or extract timbre-independent pitch from the media signal.
Figure 4:
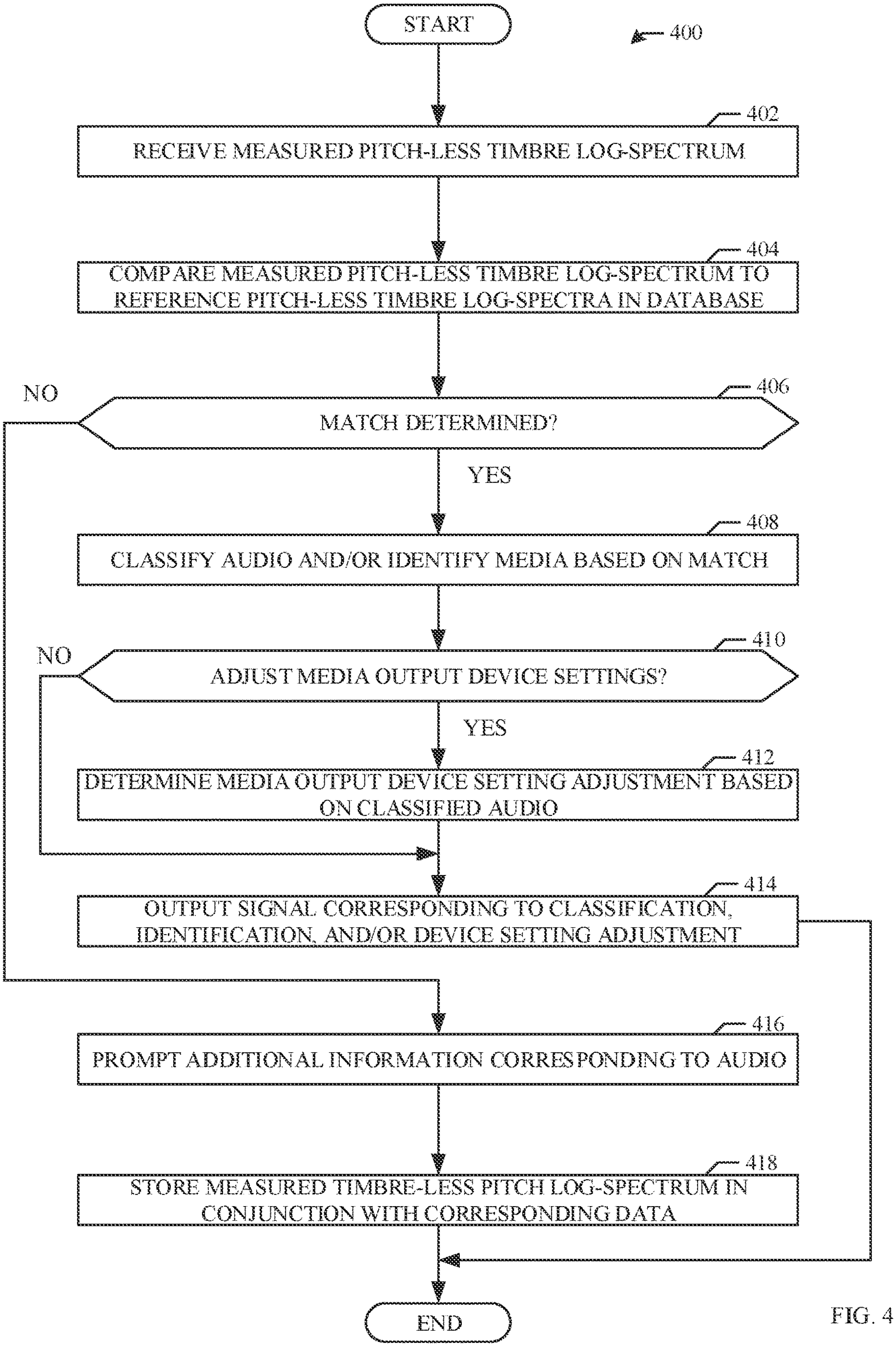
FIG. 4 is a flowchart representative of example machine readable instructions that may be executed to implement the example audio determiner of FIGS. 1 and 2 to characterize audio and/or identify media based on a pitch-less timbre log-spectrum.

A flowchart representative of example hardware logic or machine readable instructions for implementing the audio analyzer 100 of FIG. 2 is shown in FIG. 3 and a flowchart representative of example hardware logic or machine readable instructions for implementing the audio determiner 108 of FIG. 2 is shown in FIG. 4. The machine readable instructions may be a program or portion of a program for execution by a processor such as the processor 612, 712 shown in the example processor platform 600, 700 discussed below in connection with FIGS. 6 and/or 7. The program may be embodied in software stored on a non-transitory computer readable storage medium such as a CD-ROM, a floppy disk, a hard drive, a DVD, a Blu-ray disk, or a memory associated with the processor 612, 712, but the entire program and/or parts thereof could alternatively be executed by a device other than the processor 612, 712 and/or embodied in firmware or dedicated hardware. Further, although the example program is described with reference to the flowcharts illustrated in FIGS. 3-4, many other methods of implementing the example audio analyzer 100 and/or the example audio determiner 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 3 is an example flowchart 300 representative of example machine readable instructions that may be executed by the example audio analyzer 100 of FIGS. 1 and 2 to extract a pitch-independent timbre attribute from a media signal (e.g., an audio signal of a media signal). Although the instructions of FIG. 3 are described in conjunction with the example audio analyzer 100 of FIG. 1, the example instructions may be used by an audio analyzer in any environment.

At block 302, the example media interface 200 receives one or more media signals or samples of media signals (e.g., the example media signal 106). As described above, the example media interface 200 may receive the media signal 106 directly (e.g., as a signal to/from the media output device 102) or indirectly (e.g., as a microphone detecting the media signal by sensing ambient audio). At block 304, the example audio extractor 202 determines if the media signal correspond to video or audio. For example, if the media signal was received using a microphone, the audio extractor 202 determines that the media corresponds to audio. However, if the media signal is received signal, the audio extractor 202 processes the received media signal to determine if the media signal corresponds to audio or video with an audio component. If the example audio extractor 202 determines that the media signal corresponds to audio (block 304: AUDIO), the process continues to block 308. If the example audio extractor 202 determines that the media signal corresponds to video (block 306: VIDEO), the example audio extractor 202 extracts the audio component from the media signal (block 306).

At block 308, the example audio characteristic extractor 204 determines the log-spectrum of the audio signal (e.g., X). For example, the audio characteristic extractor 204 may determine the log-spectrum of the audio signal by performing a CQT. At block 310, the example audio characteristic extractor 204 transforms the log-spectrum into the frequency domain. For example, the audio characteristic extractor 204 performs a FT to the log-spectrum (e.g., F(X)). At block 312, the example audio characteristic extractor 204 determines the magnitude of the transform update (e.g., $|F(X)|$). At block 314, the example audio characteristic extractor 204 determines the pitch-independent timbre log-spectrum of the audio based on the inverse transform (e.g., inverse FT) of the magnitude of the transform output (e.g., $T=F^{-1}|F(X)|$). At block 316, the example audio characteristic extractor 204 determines the complex argument of the transform output (e.g., $e^{j\ arg(F(X))}$). At block 318, the example audio characteristic extractor 204 determines the timbre-less pitch log-spectrum of the audio based on the inverse transform (e.g., inverse FT) of the complex argument of the transform output (e.g., $P=F^{-1}(e^{j\ arg(F(X))})$).

At block 320, the example audio characteristic extractor 204 determines if the result(s) (e.g., the determined pitch and/or the determined timbre) is satisfactory. As described above in conjunction with FIG. 2, the example audio characteristic extractor 204 determines that the result(s) are satisfactory based on user and/or manufacturer result preferences. If the example audio characteristic extractor 204 determines that the results are satisfactory (block 320: YES), the process continues to block 324. If the example audio characteristic extractor 204 determines that the results are satisfactory (block 320: NO), the example audio characteristic extractor 204 filters the results (block 322). As described above in conjunction with FIG. 2, the example audio characteristic extractor 204 may filter the results by emphasizing harmonics in the timber or forcing a single peak/line in the pitch (e.g., once or iteratively).

At block 324, the example device interface 206 transmits the results to the example audio determiner 108. At block 326, the example audio characteristic extractor 204 receives a classification and/or identification data corresponding to the audio signal. Alternatively, if the audio determiner 108 was not able to match the timbre of the audio signal to a reference, the device interface 206 may transmit instructions for additional data corresponding to the audio signal. In such examples, the device interface 206 may transmit prompt to a user interface for a user to provide the additional data. Accordingly, the example device interface 206 may provide the additional data to the example audio determiner 108 to generate a new reference timbre attribute. At block 328, the example audio characteristic extractor 204 transmits the classification and/or identification to other connected devices. For example, the audio characteristic extractor 204 may transmit a classification to a user interface to provide the classification to a user.

FIG. 4 is an example flowchart 400 representative of example machine readable instructions that may be executed by the example audio determine 108 of FIGS. 1 and 2 to classify audio and/or identify media based on a pitch-independent timbre attribute of audio. Although the instructions of FIG. 4 are described in conjunction with the example audio determiner 108 of FIG. 1, the example instructions may be used by an audio determiner in any environment.

At block 402, the example device interface 210 receives a measured (e.g., determined or extracted) pitch-less timbre log-spectrum from the example audio analyzer 100. At block 404, the example timbre processor 212 compares the measured pitch-less timbre log-spectrum to the reference pitch-less timbre log-spectra in the example timbre database 214. At block 406, the example timbre processor 212 determines if a match is found between the received pitch-less timbre attribute and the reference pitch-less timbre attributes. If the example timbre processor 212 determines that a match is determined (block 406: YES), the example timbre processor 212 classifies the audio (e.g., identifying instruments and/or genres) and/or identifies media corresponding to the audio based on the match (block 408) using additional data stored in the example timbre database 214 corresponding to the matched reference timbre attribute.

At block 410, the example audio settings adjuster 216 determines whether the audio settings of the media output device 102 can be adjusted. For example, there may be an enabled setting to allow the audio settings of the media output device 102 to be adjusted based on a classification of the audio being output by the example media output device 102. If the example audio settings adjuster 216 determines that the audio settings of the media output device 102 are not to be adjusted (block 410: NO), the process continues to block 414. If the example audio settings adjuster 216 determines that the audio settings of the media output device 102 are to be adjusted (block 410: YES), the example audio settings adjuster 216 determines a media output device setting adjustment based on the classified audio. For example, the example audio settings adjuster 216 may select an audio equalizer setting based on one or more identified instruments and/or an identified genre (e.g., from the timbre or based on the identified instruments) (block 412). At block 414, the example device interface 210 outputs a report corresponding to the classification, identification, and/or media output device setting adjustment. In some examples the device interface 210 outputs the report to another device for further processing/analysis. In some examples, the device interface 210 outputs the report to the example audio analyzer 100 to display the results to a user via a user interface. In some examples, the device interface 210 outputs the report to the example media output device 102 to adjust the audio settings of the media output device 102.

If the example timbre processor 212 determines that a match is not determined (block 406: NO), the example device interface 210 prompts for additional information corresponding to the audio signal (block 416). For example, the device interface 210 may transmit instructions to the example audio analyzer 100 to (A) prompt a user to provide information corresponding to the audio or (B) prompt the audio analyzer 100 to reply with the full audio signal. At block 418, the example timbre database 214 stores the measured timbre-less pitch log-spectrum in conjunction with corresponding data that may have been received.

Figure 5:
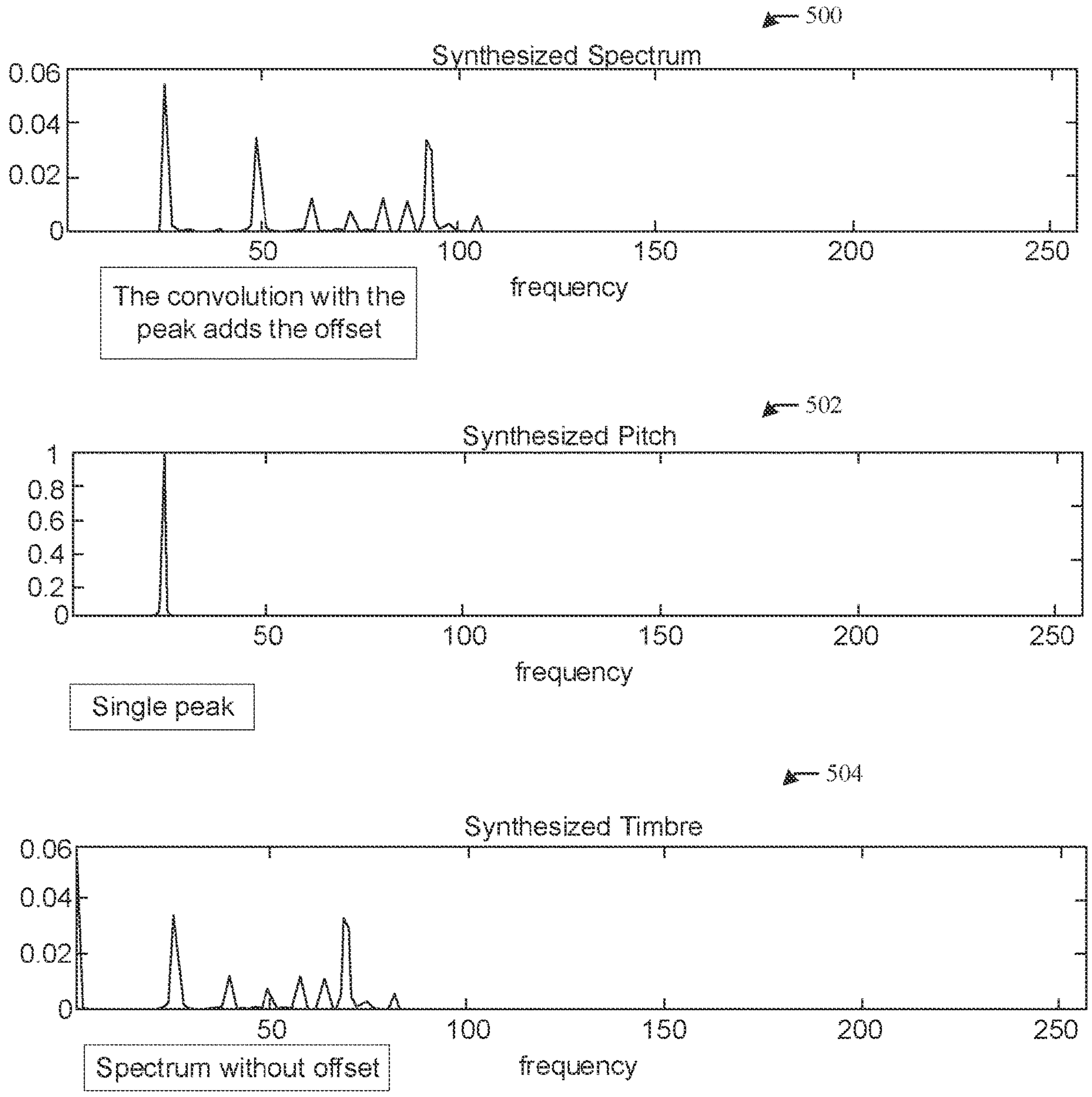
FIG. 5 illustrates an example audio signal, an example pitch of the audio signal, and an example timbre of the audio signal that may be determined using the example audio analyzer of FIGS. 1 and 2.

FIG. 5 illustrates an example FT of the log-spectrum 500 of an audio signal, an example timbre-less pitch log-spectrum 502 of the audio signal, and an example pitch-less timbre log-spectrum 504 of the audio signal.

As described in conjunction with FIG. 2, when the example audio analyzer 100 receives the example media signal 106 (e.g., or samples of a media signal), the example audio analyzer 100 determines the example log-spectrum of the audio signal/samples (e.g., if the media samples correspond to a video signal, the audio analyzer 100 extracts the audio component). Additionally, the example audio analyzer 100 determines the FT of the log-spectrum. The example FT log-spectrum 500 of FIG. 5 corresponds to an example transform output of the log-spectrum of the audio signal/samples. The example timbre-less pitch log-spectrum 502 corresponds to inverse FT of the complex argument of the example FT of log-spectrum 500 (e.g., $P=F^{-1}(e^{j\ arg(F(X))})$) and the pitch-less timbre log-spectrum 504 corresponds to the inverse FT of the magnitude of the example FT of the log-spectrum 500 (e.g., $T=F^{-1}(|F(X)|)$. As illustrated in FIG. 5, the example FT of the log-spectrum 500 corresponds to a convolution of the example timbre-less pitch log-spectrum 502 and the example pitch-less timbre log-spectrum 504. The convolution with the peak of the example pitch log-spectrum 502 adds the offset.

Figure 6:
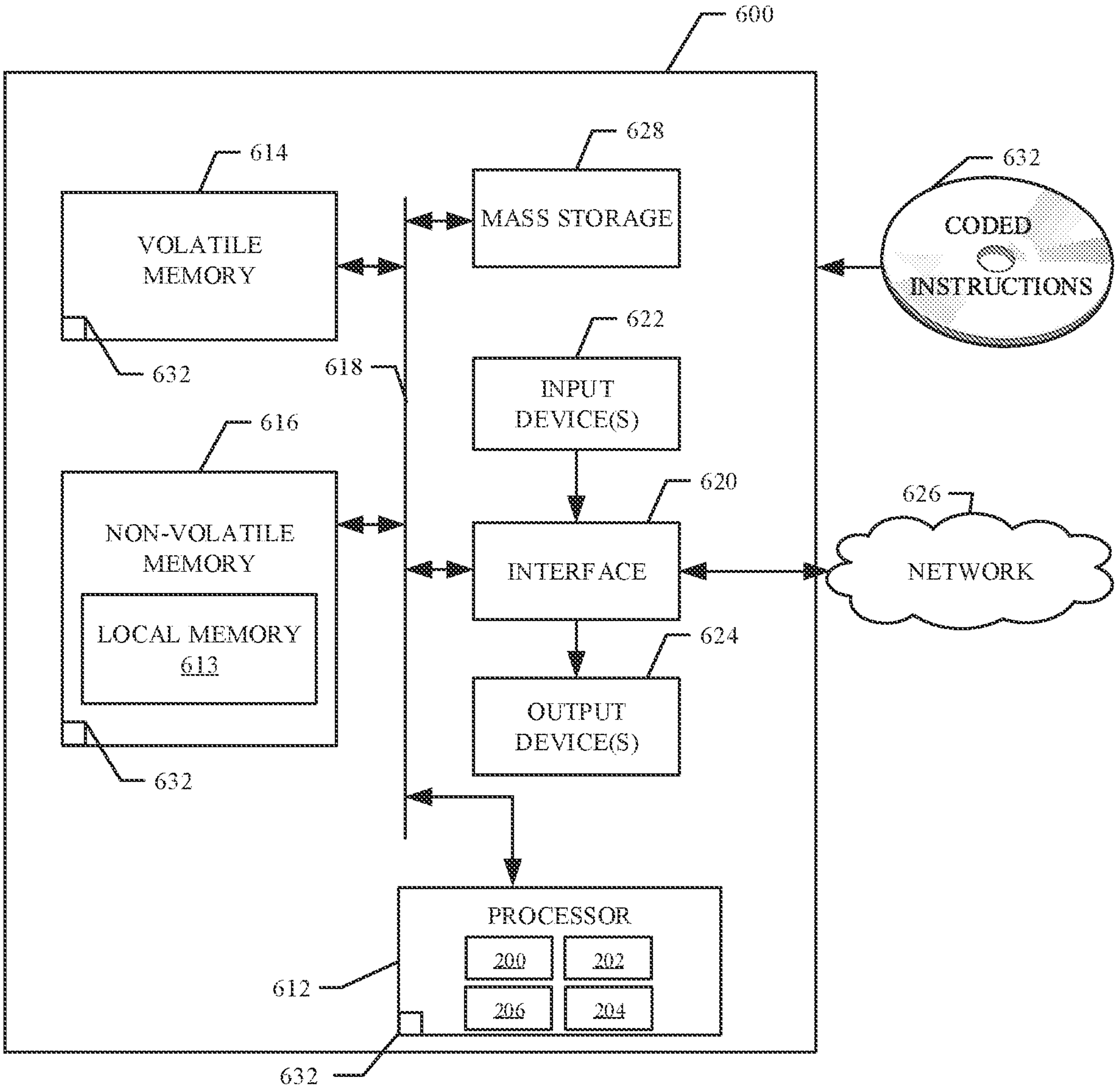
FIG. 6 is a block diagram of a processor platform structured to execute the example machine readable instructions of FIG. 3 to control the example audio analyzer of FIGS. 1 and 2.

FIG. 6 is a block diagram of an example processor platform 600 structured to execute the instructions of FIG. 3 to implement the audio analyzer 100 of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example media interface 200, the example audio extractor 202, the example audio characteristic extractor 204, and/or the example device interface of FIG. 2

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 3 may be stored in the mass storage device 628, in the volatile memory 614, in the non-volatile memory 616, and/or on a removable non-transitory computer readable storage medium such as a CD or DVD.

Figure 7:
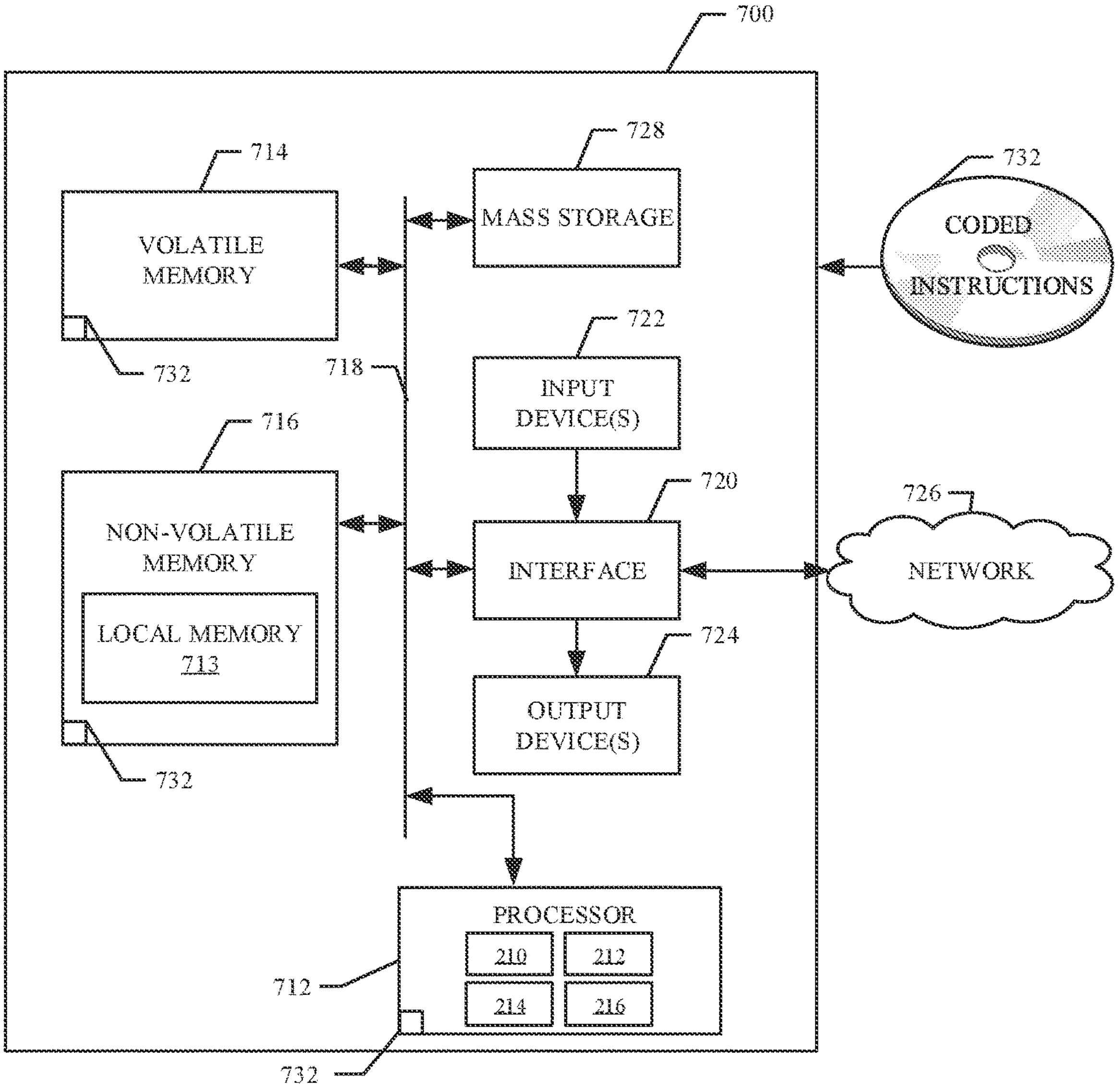
FIG. 7 is a block diagram of a processor platform structured to execute the example machine readable instructions of FIG. 4 to control the example audio determiner of FIGS. 1 and 2.

FIG. 7 is a block diagram of an example processor platform 700 structured to execute the instructions of FIG. 4 to implement the audio determiner 108 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example device interface 210, the example timbre processor 212, the example timbre database 214, and/or the example audio settings adjuster 216.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 4 may be stored in the mass storage device 728, in the volatile memory 714, in the non-volatile memory 716, and/or on a removable non-transitory computer readable storage medium such as a CD or DVD.

From the foregoing, it would be appreciated that the above disclosed method, apparatus, and articles of manufacture extract a pitch-independent timbre attribute from a media signal. Examples disclosed herein determine a pitchless independent timbre log-spectrum based on audio received directly or indirectly from a media output device. Example disclosed herein further include classifying the audio (e.g., identifying an instrument) based on the timbre and/or identifying a media source (e.g., a song, a video game, an advertisement, etc.) of the audio based on the timbre. Using examples disclosed herein, timbre can be used to classify and/or identify audio with significantly less resources then conventional techniques because the extract timbre is pitch-independent. Accordingly, audio may be classified and/or identified without the need to multiple reference timbre attributes for multiple pitches. Rather, a pitch-independent timbre may be used to classify audio regardless of the pitch.

Although certain example methods, apparatus and articles of manufacture have been described herein, other implementations are possible. The scope of coverage of this patent is not limited thereto. On the contrary, this patent covers all methods, apparatus and articles of manufacture fairly falling within the scope of the claims of this patent.

What is claimed is:

1. A computing device comprising:

one or more processors; and a tangible, non-transitory computer readable storage medium comprising instructions which, when executed cause the one or more processors to perform a set of operations comprising:

accessing a media signal;

extracting a pitch-independent timbre spectrum of the accessed media signal; and classifying the accessed media signal based on data corresponding to the pitch-independent timbre spectrum.

2. The computing device of claim 1, wherein the media signal comprises an audio signal.

3. The computing device of claim 1, wherein the media signal comprises an audio component of a video signal.

4. The computing device of claim 3, wherein the set of operations further comprise extracting the media signal from the video signal.

5. The computing device of claim 1, wherein extracting a pitch-independent timbre of the accessed media signal comprises determining a logarithmic spectrum of the media signal and transforming the logarithmic spectrum of the media signal into a frequency domain to generate a transform output.

6. The computing device of claim 5, wherein determining the logarithmic spectrum of the media signal comprises using a constant Q transform.

7. The computing device of claim 5, wherein extracting a pitch-independent timbre of the accessed media signal comprises determining a magnitude of the transform output and a timbre attribute of the media signal based on an inverse transform of the magnitude.

8. The computing device of claim 7, wherein determining the transform of the logarithmic spectrum is based on a Fourier transform and determining the inverse transform is based on using an inverse Fourier transform.

9. The computing device of claim 7, wherein determining a timbre-independent pitch attribute of the media signal is based on an inverse transform of a complex argument of the transform of the logarithmic spectrum.

10. The computing device of claim 1, wherein the classification corresponds to at least one of an instrument or a genre.

11. The computing device of claim 1, wherein the set of operations further comprises identifying a media source of the media signal based on the classification.

12. The computing device of claim 1, wherein the set of operations further comprises comparing the pitch-independent timbre spectrum of the media signal to one or more reference pitch-independent timbre spectrums, and wherein classifying the media signal is based on matching one or more reference pitch-independent timbre spectrums to the extracted pitch-independent timbre spectrum.

13. The computing device of claim 1, the set of operations further comprises comparing the pitch-independent timbre spectrum of the media signal to one or more reference pitch-independent timbre spectrums, and based on determining that the extracted pitch-independent timbre spectrum does not match the one or more reference pitch-independent timbre spectrums, prompt for additional information corresponding to the media signal.

14. The computing device of claim 1, wherein the set of operations further comprises determining a device setting adjustment based on the classification.

15. A tangible, non-transitory computer readable storage medium comprising instructions which, when executed cause one or more processors to perform a set of operations comprising:

accessing a media signal;

extracting a pitch-independent timbre spectrum of the accessed media signal; and classifying the accessed media signal based on data corresponding to the pitch-independent timbre spectrum.

16. The tangible, non-transitory computer readable storage medium of claim 15, wherein the media signal comprises an audio signal.

17. The tangible, non-transitory computer readable storage medium of claim 15, wherein the media signal comprises an audio component of a video signal.

18. The tangible, non-transitory computer readable storage medium of claim 17, wherein the set of operations further comprises extracting the media signal from the video signal.

19. The tangible, non-transitory computer readable storage medium of claim 15, wherein extracting a pitch-independent timbre of the accessed media signal comprises determining a logarithmic spectrum of the media signal and transforming the logarithmic spectrum of the media signal into a frequency domain to generate a transform output.

20. A computer-implemented method comprising:

accessing, by one or more processors, a media signal;

extracting, by the one or more processors, a pitch-independent timbre spectrum of the accessed media signal; and classifying, by the one or more processors, the accessed media signal based on data corresponding to the pitch-independent timbre spectrum.

* * * * *